United States Patent [19]
Yokota

[11] Patent Number: 5,126,993
[45] Date of Patent: Jun. 30, 1992

[54] OPTICAL DATA RECORDING/REPRODUCING APPARATUS INCLUDING DEVICE FOR PREVENTING ERRONEOUS LIGHT EMISSION

[75] Inventor: Tsuneshi Yokota, Kawasaki, Japan

[73] Assignee: Kabushiki Kaisha Toshiba, Kawasaki, Japan

[21] Appl. No.: 413,004

[22] Filed: Sep. 26, 1989

[30] Foreign Application Priority Data

Sep. 30, 1988 [JP] Japan ................... 63-245934

[51] Int. Cl.⁵ .......................... G11B 13/00; G11B 7/00
[52] U.S. Cl. ...................................... 369/116; 369/32; 369/44.33; 369/54; 369/100
[58] Field of Search .............. 369/116, 32, 44.31, 369/44.33, 44.29, 44.35, 111, 100, 54

[56] References Cited

U.S. PATENT DOCUMENTS

| | | |
|---|---|---|
| 4,499,571 | 2/1985 | Yokota . |
| 4,507,767 | 3/1985 | Takasugi ................ 369/116 |
| 4,509,156 | 4/1985 | Ohara et al. ............ 369/116 |
| 4,730,290 | 3/1988 | Takasago et al. ....... 369/32 |
| 4,750,161 | 6/1988 | Takeuchi et al. ....... 369/116 |
| 4,858,219 | 8/1989 | Yoshikawa ............. 369/116 |

FOREIGN PATENT DOCUMENTS 52-67303  6/1977  Japan ................... 369/111
54-147006  11/1979  Japan .

Primary Examiner—Roy N. Envall, Jr.
Assistant Examiner—Khoi Truong
Attorney, Agent, or Firm—Finnegan, Henderson, Farabow, Garrett and Dunner

[57] ABSTRACT

In an apparatus for optically recording data on and reproducing it from an optical disk, the level of a laser beam in reproducing mode is subjected to feedback control and the level of a laser beam in recording mode is controlled in accordance with the output of a capacitor which stores the level of the laser beam in reproducing mode. This apparatus monitors the output of a photodetector in a feedback circuit, which receives reflection light from the optical disk, and a current flowing through a drive transistor for supplying a drive signal to the laser source. When a large amount of light or a large drive current is detected in a standby mode or in a period in which the optical disk is rotated in a low speed, emission of the laser beam is disabled and the kind of malfunction is recorded.

16 Claims, 6 Drawing Sheets

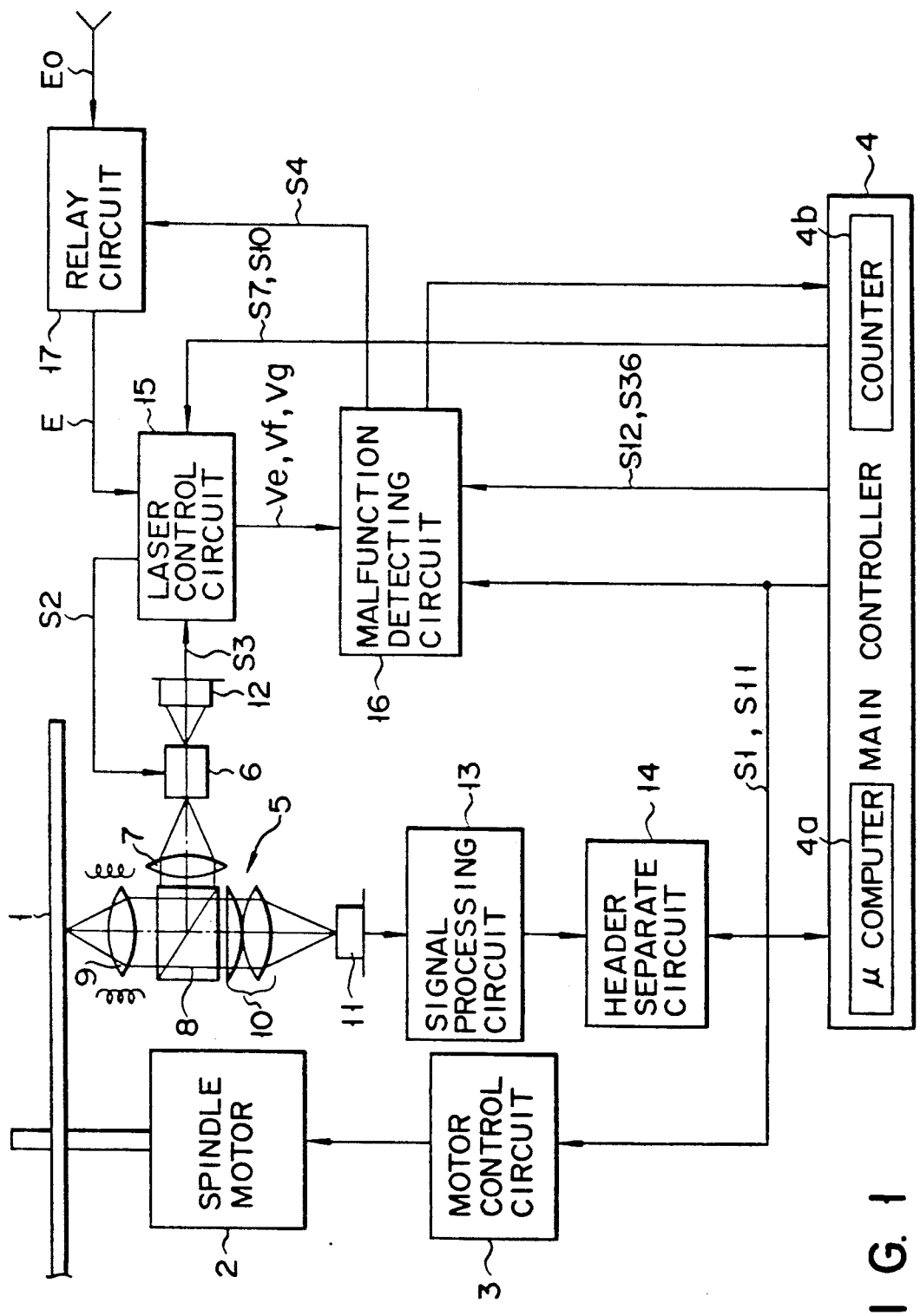
F I G. 1

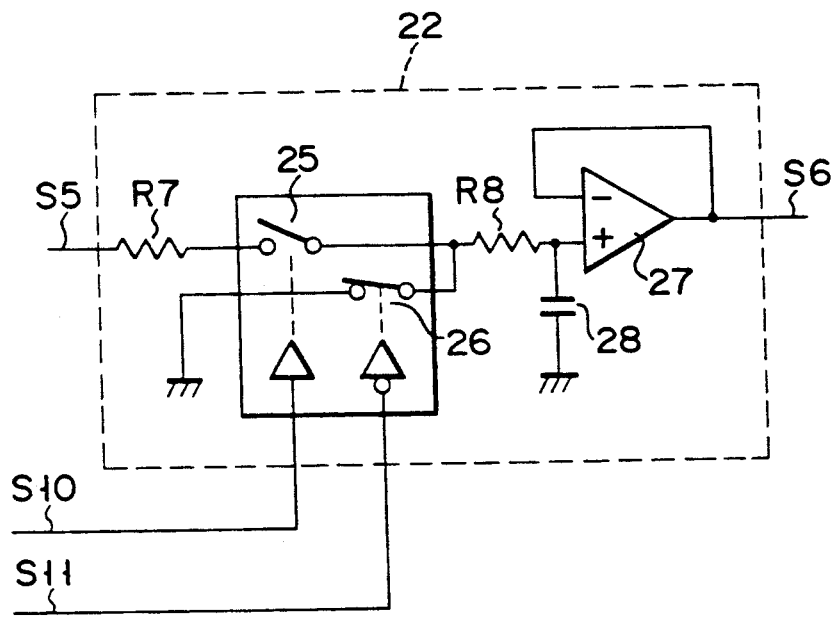
F I G. 5

OPTICAL DATA RECORDING/REPRODUCING APPARATUS INCLUDING DEVICE FOR PREVENTING ERRONEOUS LIGHT EMISSION

BACKGROUND OF THE INVENTION

1. Field of the Invention

The present invention relates to an optical data recording apparatus which records data on an optical data recording medium, such as on an optical disk.

2. Description of the Related Art

According to such an apparatus, a light beam with a predetermined intensity irradiates a writable or erasable optical disk to record data thereon. The most serious problem for this type of apparatus is the overwriting of new data on those tracks which have data already recorded thereon. The main cause for such overwriting is improper tracking at the time of data recording.

A conventional measure to prevent overwriting is disclosed in Japanese Patent Disclosure No. 54-147006. The disclosed conventional apparatus has a circuit for searching for a non-recorded region while monitoring a reproduced signal at the time of data recording, and a gate for disabling a recording circuit even upon reception of a recording command unless a non-recorded region detection signal is present. Another apparatus, known in the art, writes a record-completion flag in a recorded region on the recording medium to thereby prevent overwriting (data destruction).

However, these conventional apparatuses for preventing overwriting are not particularly designed to cope with a case where data on an optical disk is destroyed by malfunction of a circuit itself for controlling light emission of a semiconductor laser. At the time of data recording or reproducing with a light emission command being issued, if only a laser beam with a less than a predetermined intensity is detected due to malfunction of a photodiode, a laser may emit a high intensity of light because of a feedback control employed so that data is erroneously written on the recording medium. The aforementioned data destruction preventing measures cannot deal with this case; no precautions taken against such abnormal light emission would certainly increase and spread data destruction.

SUMMARY OF THE INVENTION

Accordingly, it is an object of this invention to provide an optical data recording/reproducing apparatus which prevents data destruction due to a malfunction of a circuit itself.

According to one aspect of the present invention, there is provided an optical data recording/reproducing apparatus comprising a light source for irradiating a light beam onto a recording medium, a detector for detecting an amount of light from the light source means, a controller for controlling an amount of light from the light source means in accordance with the amount of light detected by the detector, and a circuit for inhibiting light emission from the light source when the amount of light detected is greater than or equal to a predetermined amount during a period in which a light emission stop command is given to the light source.

BRIEF DESCRIPTION OF THE DRAWINGS

FIG. 1 is a schematic block diagram illustrating an optical data recording/reproducing apparatus according to one embodiment of the present invention;

FIG. 5 is a circuit diagram of a selector;

DETAILED DESCRIPTION OF THE PREFERRED EMBODIMENT

A preferred embodiment of an optical data recording/reproducing apparatus according to this invention will now be described with reference to the accompanying drawings.

FIG. 1 schematically illustrates the arrangement of an optical disk apparatus according to one embodiment of this invention.

Figure 2:
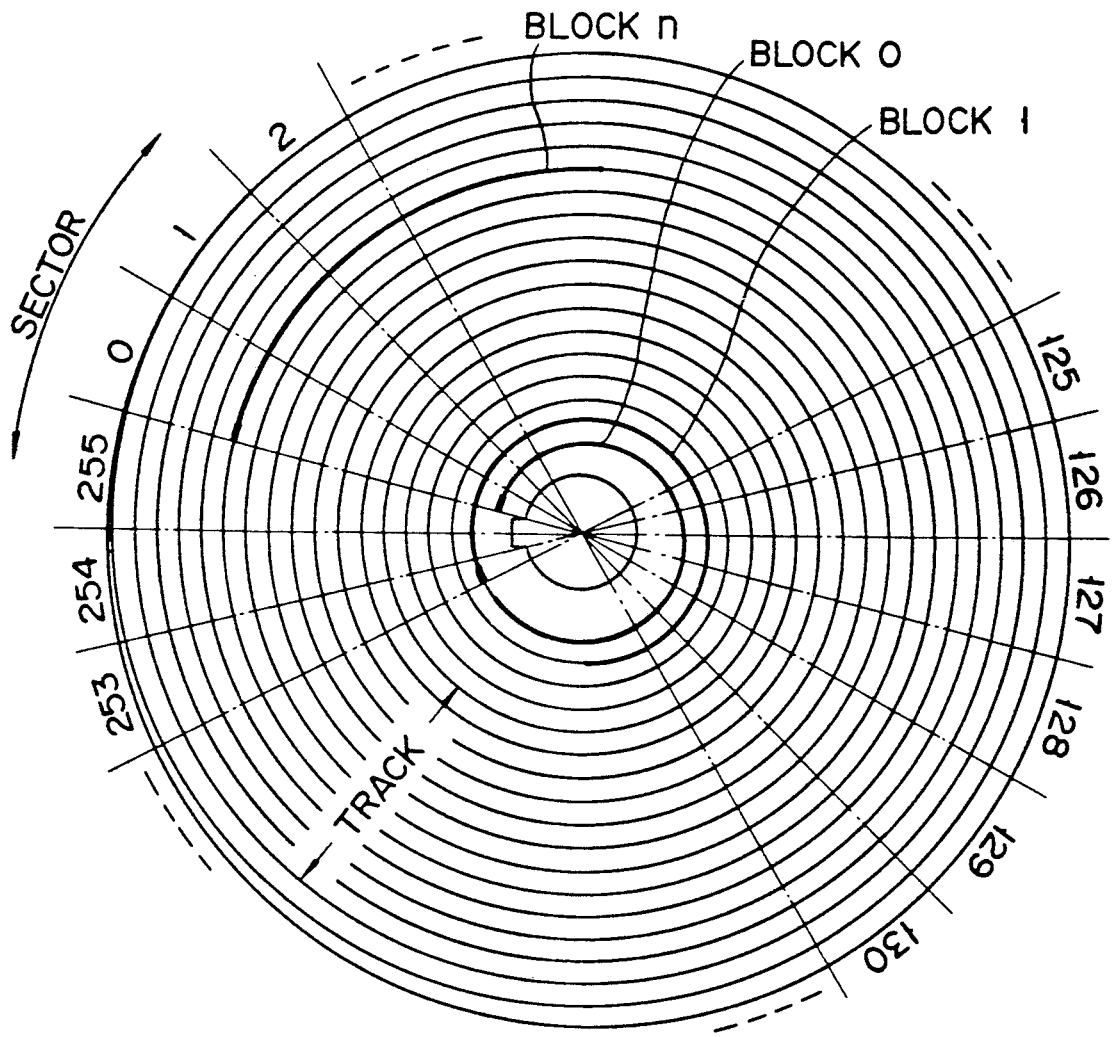
FIG. 2 is a diagram illustrating the track structure of an optical disk.
Figure 3:
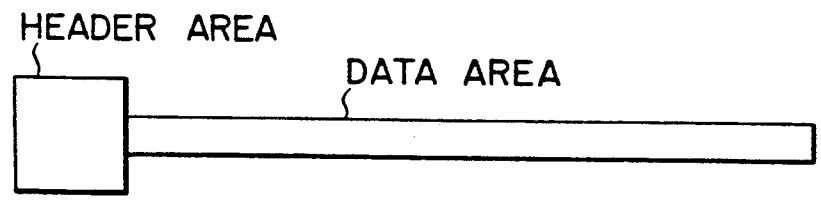
FIG. 3 is a diagram illustrating the block structure of the optical disk.

An optical disk 1 serving as an optical recording medium comprises a glass or plastic, disk-shaped substrate and a metal coating layer, which is coated onto one surface (underside in this example) of the substrate and is composed of tellurium or bismuth. As shown in FIG. 2, the optical disk 1 has spiral tracks formed on its surface. These tracks, which are in fact a single track, are given track numbers for individual turns for the sake of convenience. Each turn of the tracks is divided into 256 sectors at equal angles. The entire recording area on the disk is divided into blocks of equal storage sizes, for example, 4 KB. As shown in FIG. 3, each block consists of a header area indicating the block number, etc. and a data area following the header area. The header area is formed in advance at the time the disk is produced and has a nearly square shape wider than the data area. Since the sectors are divided with equal angles, the storage size of each sector is the smallest for the innermost track and increases toward outer tracks. Accordingly, there are a greater number of sectors per block for the inner tracks. Further, the number of sectors per block need not necessarily be an integer, although the beginning of the header area should always coincide with the beginning of its associated sector. As data access is carried out in units of blocks, the optical disk stores directory data indicating at which sector of which track each block starts and ends.

Referring again to FIG. 1, the optical disk 1 is rotated by a spindle motor 2 under the control of a motor control circuit 3. The activation and deactivation of the spindle motor 2 is controlled in accordance with a rotate command signal S1 from a main controller 4. The main controller 4 is mainly comprised of a microcomputer 4a and counter 4b and performs the general control of the apparatus including the control of driving the spindle motor 2.

An optical head 5 is disposed under the optical disk 1. This optical head 5 accesses the optical disk 1 for data recording and reproducing, and comprises a semiconductor laser oscillator 6, a collimator lens 7, a beam splitter 8, an objective lens 9, a condensing lens 10, a photodetector 11 and a photodiode 12.

The semiconductor laser oscillator 6 generates a divergent laser beam in accordance with a drive signal S2 from a laser control circuit 15. In writing (recording) data on a recording film of the optical disk 1, the semiconductor laser oscillator 6 generates a high-intensity laser beam whose intensity is modulated in accordance with data to be written. In reading (reproducing) data from the recording film of optical disk 1, the oscillator 6 generates a laser beam with a low constant intensity.

The divergent laser beam from the semiconductor laser oscillator 6 is converted into parallel beams by the collimator lens 7, and the resultant beams propagate to the beam splitter 8. After reflection by the beam splitter 8, the laser beams enter the objective lens 9 which in turn focuses the beams onto the recording film of the optical disk 1.

The objective lens 9 is suspended in such a way that it is movable in the direction of its optical axis (directions away from and toward the optical disk 1) and in the direction perpendicular to the optical axis (direction parallel to the surface of the optical disk 1). With the objective lens 9 located at a predetermined position, the laser beams focused by the lens 9 irradiate the surface of the recording film of the optical disk 1 and beam spots are formed on a specific track on the surface of this recording film. The objective lens 9 under this situation is held at both a focused state and an ON track state, thus enabling data writing or reading.

In the focused state, the divergent laser beam reflected from the recording film on the optical disk 1 is converted into parallel beams by the objective lens 9, which are then returned to the beam splitter 8. The returned beams passing through the beam splitter 8 are received through the condensing lens 10 onto the photodetector 11. The photodetector 11 is provided as a photodetector cell for converting incident light into an electric signal. The electric signal, generated by the photoelectric conversion in the photodetector 11, is sent as a reproduced signal to a signal processing circuit 13.

The photodiode 12 serving as a photoelectric converting element is provided on the opposite side to that of the semiconductor laser oscillator 6 from which a recording or reproducing laser beam is emitted. Upon reception of a monitor beam from the oscillator 6, the photodiode 12 converts the beam into an electric signal and sends that signal as a laser monitor signal S3, of the oscillator 6, to the laser control circuit 15.

The optical head 5 can be moved in the radial direction of the optical disk 1 by a moving mechanism (not shown) comprising a linear motor, for example. Accordingly, the optical head 5 is moved by this moving mechanism to a track targeted for data recording or reproducing.

The signal processing circuit 13 executes amplification of the reproduced signal, photoelectrically converted by the photodetector 11, performs binary conversion of the signal, etc. The reproduced signal subjected to binary conversion in the signal processing circuit 13 is sent to a header separate circuit 14. This circuit 14 separates data in the header area and data in the data area from the binary reproduced signal and sends those data to the main controller 4.

The laser control circuit 15 receives the laser monitor signal S3 from the photodiode 12 and performs a feedback control of the drive signal S2 based on the signal S3 to keep the optical output of the oscillator 6 at a constant level. A detailed description of this operation will be given later. A malfunction detecting circuit 16 detects various possible malfunctions of the laser control circuit 15, and the detection result is supplied to the main controller 4 as well as a relay circuit 17. A detailed description of the malfunction detecting circuit 16 will also be given later. A switching operation of the relay circuit 17 is controlled based on a malfunction detecting signal S4 from the detecting circuit 16. The relay circuit 17 cuts off only a voltage E which is derived from a source voltage Eo supplied from a voltage source (not shown) and is supplied to the semiconductor laser oscillator 6, photodiode 12 and laser control circuit 15.

Figure 4:
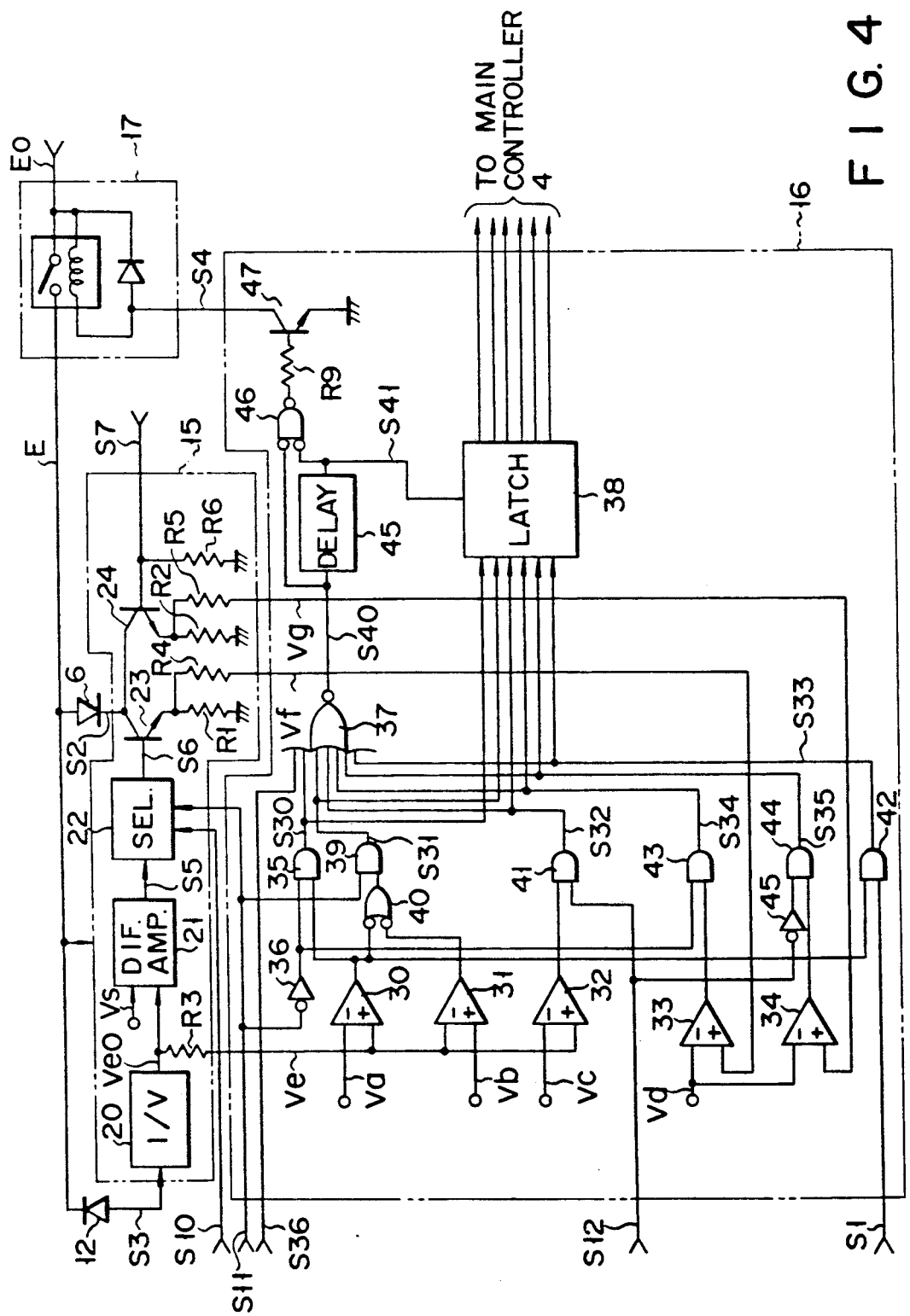
FIG. 4 is a circuit diagram illustrating a laser control circuit and a malfunction detecting circuit according to one embodiment.

Referring to FIG. 4, a detailed description of the laser control circuit 15 and malfunction detecting circuit 16 is given next. In the laser control circuit 15, the laser monitor signal S3, which has undergone photoelectric conversion in the photodiode 12 to become a current signal, enters a current/voltage (I/V) converter 20 where it is converted into a voltage signal Veo in accordance with the intensity of the light on the photodiode 12 or the optical output of the semiconductor laser oscillator 6. The voltage signal Veo from the converter 20 is supplied to a differential amplifier 21 which also receives as the other input a reference voltage Vs generated from a constant voltage source (not shown). The differential amplifier 21 compares these voltages Veo and Vs with each other, amplifies the difference and sends it as an error signal S5 to a selector 22. The reference voltage Vs is a constant voltage to provide the necessary optical output for data reproduction, and feedback control is performed to cause the voltage signal Veo to approach the reference voltage Vs (which will be described later), thus ensuring a constant optical output from the semiconductor laser oscillator 6.

The selector 22 controls the opening and closing of a control loop in accordance with the operation mode, such as a recording or reproducing mode, i.e., ON/OFF of the feedback loop. FIG. 5 illustrates the detailed structure of the selector 22. The error signal S5 from the differential amplifier 21 is supplied through a resistor R7 to one end of a switch 25 which has the other end coupled through a resistor R8 to a non-inverted input terminal of an operational amplifier 27. The switching operation of the switch 25 is controlled by a control loop ON/OFF signal S10 output from the main controller 4. The other end of the switch 25 (one end of the resistor R8) is grounded through a switch 26 whose switching operation is controlled by a reproduced optical output control signal S11 also output from the main controller 4. The other end of the resistor R8, i.e., the non-inverted input terminal of the operational amplifier 27, is grounded through a capacitor 28 serving to hold a drive voltage. The operational amplifier 27 serves as a buffer and sends its output signal S6 to the base of a transistor 23.

In FIG. 4, to generate a low-intensity laser beam with a constant level as reproducing light, the transistor 23 drives the semiconductor laser oscillator 6 in accordance with the signal S6 supplied to its base. The emitter of the transistor 23 is grounded through a resistor R1. In order to generate a high-intensity laser beam as recording light according to recording data, a transistor 24 drives the semiconductor laser oscillator 6 in accordance with a recording signal S7 supplied to its base. The emitter of the transistor 24 is grounded through a resistor R2.

The operation of the laser control circuit 15 is described next. The control loop ON/OFF signal S10 from the main controller 4 is rendered at a high level (hereinafter referred to as "H" level) only when data recorded on the optical disk 1 is reproduced and is rendered at a low level (hereinafter referred to as "L" level) otherwise, for example, in standby mode or data recording mode. In reproducing mode, therefore, the signal S10 is at an "H" level, so that the switch 25 is turned on to thereby form a feedback loop. In this manner, the level of the reproduced light is subjected to feedback control. The reproduced optical output control signal S11 from the main controller 4 is at an "L" level in standby mode and at an "H" level in data reproducing mode or recording mode. The switch 26 is turned on when the signal S11 is at the "L" level and turned off when it is at the "H" level.

Since both of the control loop ON/OFF signal S10 and reproduced optical output control signal S11 are at an "L" level in standby mode, the switch 25 is OFF while the switch 26 is ON. Accordingly, the non-inverted input terminal of the operational amplifier 27 is grounded and its output signal S6 becomes 0 volt. As a result, the transistor 23 is turned off and the semiconductor laser oscillator 6 generates no laser beam. As the recording signal S7 is not of course supplied to the base of the transistor 24 at this time, the transistor 24 is also OFF.

In reproducing mode, both of the signals S10 and S11 are at an "H" level, so that the switch 25 is ON while the switch 26 is OFF. Accordingly, the feedback loop is closed and the selector 22 outputs the signal S6 according to the input error signal S5. In other words, as the error signal S5 from the differential amplifier 21 is supplied through the selector 22 to the base of the transistor 23, the drive signal S2 flows through the collector of the transistor 23, thus causing the semiconductor laser oscillator 6 to emit a laser beam. The optical output of the oscillator 6 is photoelectrically converted by the photodiode 12 and the resultant current signal is supplied as the laser monitor signal S3 to the current/voltage converter 20. The converter 20 converts the received current signal S3 into the voltage signal Veo and sends it to the differential amplifier 21. In turn, the differential amplifier 21 compares the voltage signal Veo with the reference voltage Vs and outputs the difference as the error signal S5. The error signal S5 serves to decrease the optical output of the oscillator 6 when the voltage signal Veo is greater than the reference voltage Vs and serves to increase the same when the signal Veo is smaller than the signal Vs. Through this feedback control, therefore, the voltage signal Veo becomes equal to the reference voltage Vs to thereby keep the optical output of the oscillator 6 at a constant level.

In recording mode, the control loop ON/OFF signal S10 is at an "L" level while the reproduced optical output control signal S11 is at an "H" level. Accordingly, both of the switches 25 and 26 are OFF. The voltage that was supplied to the non-inverted input terminal of the operational amplifier 27 during the previous reproducing mode is held in the capacitor 28. In reproducing header data that is executed prior to data recording, the transistor 23 is driven by this held voltage to provide reproducing light. When the recording signal S7 according to the data to be recorded is supplied to the base of the transistor 24, the drive signal S2 flows through the collector thereof, thus causing the semiconductor laser oscillator 6 to emit a laser beam to record data on the optical disk 1.

The malfunction detecting circuit 16, which serves to detect an internal malfunction of the laser control circuit 15, monitors the output voltage of the current/voltage converter 20, and the emitter voltages of the transistors 23 and 24. The voltage signal Veo appearing at the output terminal of the converter 20 is taken as a voltage signal Ve through a resistor R3 having a sufficiently greater resistance than that of the output resistor of the converter 20. The voltage signal appearing at the emitter terminal of the transistor 23 is taken as a voltage signal Vf through a resistor R4 having a sufficiently greater resistance than that of the emitter resistor R1. The voltage signal appearing at the emitter terminal of the transistor 24 is taken as a voltage signal Vg through a resistor R5 having a sufficiently greater resistance than that of the emitter resistor R2. The resistors R3 to R5 are located at the proximities of the output terminal of the converter 20, the emitter terminal of the transistor 23 and the emitter terminal of the transistor 24, respectively. Since sufficiently large resistors provided at the proximities of the signal sources are used in extracting signals from the signal sources, the adverse influence of provision of the malfunction detecting circuit 16 onto the laser control circuit 15 is minimized and reduction in reliability of the circuit 15 can be prevented.

The voltage signal Ve taken through the resistor R3 is supplied to an inverted input terminal (− terminal) of a comparator 31 as well as to the non-inverted input terminals (+ terminals) of the comparators 30 and 32. The comparator 30 has its inverted input terminal supplied with a reproduced light lower limit voltage Va from a constant voltage source (not shown). Accordingly, the comparator 30 outputs an "L" level signal when the voltage signal Ve is smaller than the voltage Va and outputs an "H" level signal when the voltage signal Ve is greater than the voltage Va. The comparator 31 has its non-inverted input terminal supplied with a reproduced light upper limit voltage Vb from a constant voltage source (not shown). Accordingly, the comparator 31 outputs an "L" level signal when the voltage signal Ve is greater than the voltage Vb and outputs an "H" level signal when the voltage signal Ve is smaller than the voltage Vb. The comparator 32 has its inverted input terminal supplied with a recording light upper limit voltage Vc from a constant voltage source (not shown). Accordingly, the comparator 32 outputs an "L" level signal when the voltage signal Ve is smaller than the voltage Vc and outputs an "H" level signal when the voltage signal Ve is greater than the voltage Vc.

The output of the comparator 30 is supplied to one input of an AND gate 35 which has the other input supplied with the reproduced optical output control signal S11 which is inverted by an inverter 36. A signal S30 resulting from a logical product executed by the AND gate 35 is supplied to an NOR gate 37 and a latch 38. An AND gate 39 has one of its inputs supplied with the control signal S11 and the other input supplied with a signal which is attained by inverting the result of a logical product of the outputs of the comparators 30 and 31 executed by a NAND gate 40. A signal S31 resulting from a logical product performed by the AND gate 39 is supplied to the NOR gate 37 and latch 38. An AND gate 41 has one of its inputs supplied with the output signal of the comparator 32 and the other input supplied with the recording control signal S12 from the main controller 4. An output signal S32 resulting from a logical product performed by the AND gate 41 is supplied to the NOR gate 37 and latch 38. An AND gate 42 has one of its inputs supplied with the output signal of the comparator 30 and the other input supplied with the rotate command signal S1 from the main controller 4. A signal S33 resulting from a logical product performed by the AND gate 42 is supplied to the NOR gate 37 and latch 38. The rotate command signal S1 is output to have an "L" level when it specifies rotation of the spindle motor 2 and an "H" level when specifying stopping of the motor 2.

A comparison voltage Vd from a constant voltage source (not shown) is supplied to the inverted input terminals of the comparators 33 and 34. This voltage Vd of a relatively low level serves to detect the presence or absence of an emitter current in the transistors 23 and 24. A voltage taken from the emitter of the transistor 23 is input as the emitter voltage signal Vf through the resistor R4 to the non-inverted input terminal of the comparator 33. The output of the comparator 33 is supplied to one input of an AND gate 43 which has the other input supplied with the output of the inverter 36. An output signal S34 resulting from a logical product performed by the AND gate 43 is supplied to the NOR gate 37 and latch 38. A voltage taken from the emitter of the transistor 24 is input as the emitter voltage signal Vg through the resistor R5 to the non-inverted input terminal of the comparator 34. The output of the comparator 34 is supplied to one input of an AND gate 44 which has the other input supplied with the recording control signal S12 inverted by an inverter 45. A signal S35 resulting from a logical product performed by the AND gate 44 is supplied to the NOR gate 37 and latch 38.

The output signals S30-S35 of the AND gates 35, 39 and 41 to 44 and the signal S36 (a description of which is provided below) directly output from the main controller 4, are processed in a logical product operation and are inverted by the NOR gate 37, and the resultant signal is supplied as an error signal S40 to a delay element 45 and one input of an OR gate 46. The delay element 45 outputs the error signal S40 with a constant delay of time Td, and the delayed signal S41 is supplied to the other input of the OR gate 46 and the latch 38. A signal resulting from a logical product performed by the OR gate 46 is supplied to the base of a transistor 47 through a resistor R9. The transistor 47 whose ON/OFF operation is controlled by a signal from the OR gate 46 effects connection or disconnection of the contact of the relay circuit 17 by the malfunction detecting signal S4 generated from its collector. The constant time Td is a time in which a destruction of data recorded on the optical disk 1 can be recovered, and more specifically, it is the maximum time to correct a burst error by an error correcting circuit provided in the data recording/reproducing apparatus. In other words, the time is determined to be within a range having as a limit a time corresponding to a period in which correction is done by the error correcting circuit and correct data can be attained. The latch 38 latches the individual output signals S30-S35 of the aforementioned AND gates 35, 39 and 41-44 using the signal S41 output from the delay element 45 as a latch timing signal. The output of the latch 38 is sent to the main controller 4 and is used for analyzing and displaying the cause of a malfunction.

Figure 6:
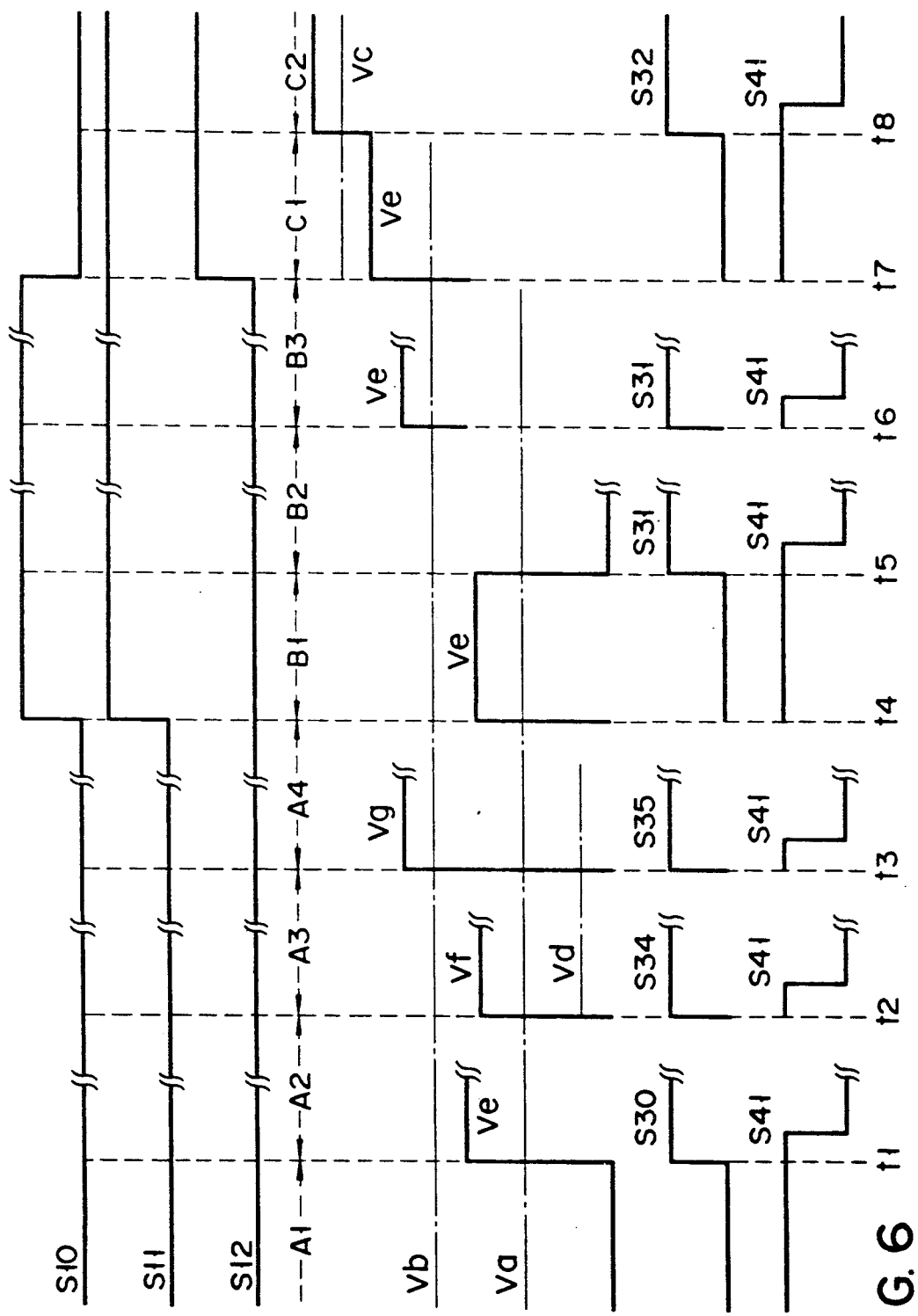
FIG. 6 is a signal waveform diagram for explaining the operation of the malfunction detecting circuit.

The operation of the malfunction detecting circuit 16 will be described below referring to the signal waveform diagram shown in FIG. 6. There are generally three types of operation modes for this apparatus, which are defined by the control loop ON/OFF signal S10, reproduced optical output control signal S11 and recording control signal S12 all output from the main controller 4. As shown in FIG. 6, in first mode A (A1-A4), no laser beam is generated as in standby mode, and all of the signals S10, S11 and S12 are at an "L" level. In second mode B (B1-B3), a laser beam with a low intensity necessary for data reproduction is generated as in reproducing mode, and the signals S10 and S11 are at an "H" level while the signal S12 is at an "L" level. In third mode C (C1 and C2), a laser beam with a high intensity necessary for data recording is generated as in recording mode, and the signal S10 is at an "L" level while the signals S11 and S12 are at an "H" level. The operation of the malfunction detecting circuit 16 in each mode will be described below.

To begin with, a description will be given of an abnormal operation or malfunction of the laser control circuit 15 in mode A. This is the case where emission of a laser beam is detected although no laser beam is actually generated. During the period A1 in FIG. 6, the semiconductor laser oscillator 6 is not driven and the photodiode 12 produces no photoelectrically-converted output. This period indicates a normal state in which voltage signal Ve is kept at 0 volt.

If a laser beam is generated due to some malfunction of the laser control circuit 15 and the voltage signal Ve higher than the reproduced light lower limit voltage Va is generated at the beginning t1 of the period A2, a signal with an "H" level will appear at the output of the comparator 30 and be supplied to one input of the AND gate 35. The other input terminal of the AND gate 35 is supplied with an "H" level signal attained by inverting the reproduced optical output control signal S11 by the inverter 36. Consequently, the AND gate 35 outputs the signal S30 which rises to "H" level at time t1. This signal S30 is inverted as it passes through the NOR gate 37 and is supplied as the error signal S40 with an "L" level to the OR gate 46 and delay element 45. The output S41 of delay element 45 becomes an "L" level after elapse of constant time Td. If the signal S30 still has an "H" level upon elapse of the constant time Td, the OR gate 46 outputs a signal with an "L" level which is then supplied to the base of the transistor 47 through the resistor R9. This cuts off the malfunction detecting signal S4 flowing through the collector of the transistor 47 to thereby disconnect the contact of the relay circuit 17. As a result, supply of the voltage E to the semiconductor laser oscillator 6, photodiode 12 and laser control circuit 15 is shut off. In this manner, emission of a laser beam from the oscillator 6 is disabled to thereby prevent data on the optical disk 1 from being destroyed by an erroneous beam emitted by the malfunction of the laser control circuit 15.

The output signal S30 of the AND gate 35 is latched, by the latch 38, as a signal representing the cause of a malfunction at the falling of the signal S41 output from the delay element 45. The output signal from the latch 38 is supplied to the main controller 4 and is used there so that the controller 4 can analyze a malfunctioning section and provide an indication of the abnormality such as by turning on an abnormal indicator, generating a buzzer or displaying a message.

As the output voltage Ve of the photodiode 12 is monitored in the above manner, an erroneous beam emission in standby mode can be detected and overwriting of data can be thus prevented by stopping this beam emission.

A description will now be given of a case where a malfunction that can destroy data on the optical disk 1 is detected although the voltage signal Ve from the current/voltage converter 20 is 0 volt. When a laser beam is erroneously emitted even in standby mode, if the system for producing the voltage signal Ve is malfunctioning, the voltage signal Ve will always be 0 volt. Therefore, erroneous emission of a laser beam may not be detected by the voltage signal Ve alone in some cases. In such a case, the erroneous emission of a laser beam can be detected by monitoring the drive currents of the transistors 23 and 24 which serve to drive the semiconductor laser. The voltages Vf and Vg extracted from the emitters of the transistors 23 and 24 should normally be 0 volt in standby mode.

If the voltage signal Vf having a magnitude higher than the comparison voltage Vd is generated at the beginning t2 of the period A3 due to some malfunction of the laser control circuit 15, an "H" level signal will appear at the output terminal of the comparator 33 and be supplied to one input of the AND gate 43. The other input terminal of the AND gate 43 is supplied with an "H" level signal attained by the inverter 36 inverting the reproduced optical output control signal S11. Consequently, the AND gate 43 outputs the signal S34 which rises to "H" level at time t2. This signal S34 is inverted as it passes through the NOR gate 37 and is supplied as the error signal S40 with an "L" level to the OR gate 46 and delay element 45. The contact of the relay circuit 17 will be disconnected as per the previously-described operation, thus cutting off the voltage E. In this manner, even a laser drive current is detected in standby mode and emission of a laser beam is disabled to thereby prevent data on the optical disk 1 from being destroyed by an erroneous beam caused by the malfunction of the laser control circuit 15.

Similarly, if the voltage signal Vg having a magnitude higher than the comparison voltage Vd is generated at the beginning t3 of the period A4 due to some malfunction of the laser control circuit 15, an "H" level signal will appear at the output terminal of the comparator 34 and be supplied to one input of the ANDgate 44. The other input terminal of the AND gate 44 is supplied with an "H" level signal attained by the inverter 45 inverting the recording control signal S12. Consequently, the AND gate 44 outputs the signal S35 which rises at time t3. The signal S35 is inverted as it passes through the NOR gate 37 and is supplied as the error signal S40 with an "L" level to the OR gate 46 and delay element 45. The contact of the relay circuit 17 will be disconnected as per the previously-described operation, thus cutting off the voltage E. In this manner, even a drive current is detected in standby mode and emission of a laser beam is disabled to thereby prevent data on the optical disk 1 from being destroyed by an erroneous beam caused by the malfunction of the laser control circuit 15. Further, a signal representing the cause of the malfunction will be latched by the latch 38 in an operation similar to the aforementioned operation and will be used for an analysis of the malfunction that is executed later.

Since the occurrence of abnormalities in standby mode or the like where a laser beam is not supposed to be emitted can be detected in accordance with the output of the photodiode 12 and drive currents of the laser-driving transistors 23 and 24, it is assured that destruction of data on the optical disk 1 by overwriting of data can be prevented.

A description will now be given of how to detect an abnormal operation (malfunction) of the laser control circuit 15 in modes B and C in which a laser beam will be emitted. This is a case where generation of a predetermined laser beam is not detected although a laser beam is actually emitted. During the period B1 in FIG. 6, the voltage signal Ve from the photodiode 12 is between the reproduced light lower limit voltage Va and reproduced light upper limit voltage Vb. This period indicates that data reproduction is properly executed.

If the voltage signal Ve having a magnitude lower than the reproduced light lower limit voltage Va is generated at the beginning t5 of the period B2 due to some malfunction of the laser control circuit 15, an "L" level signal will appear at the output terminal of the comparator 30 and be supplied to one input of the NAND gate 40. Consequently, the output of the NAND gate 40 becomes "H" level and is supplied to one input of the AND gate 39 which has the other input terminal supplied with the reproduced optical output control signal S11 with an "H" level. As a result, the AND gate 39 outputs the signal S31 which rises at time t5. The signal S31 is inverted as it passes through the NOR gate 37 and is supplied as the error signal S40 to the OR gate 46 and delay element 45. The contact of the relay circuit 17 will be disconnected as per the previously-described operation, thus cutting off the voltage E. The following is the reason why supply of the voltage E is stopped even though the voltage signal Ve is smaller than the reproduced light lower limit Va. In a case where, although output of reproduced light with a high intensity is requested, the level of the voltage signal Ve is lower than the high level, a command to increase the drive current will be output from the differential amplifier 21 due to the feedback control employed. If the voltage signal Ve is 0, a command to provide the maximum drive current will be given so that the output of the semiconductor laser oscillator 6 will gradually increase. Accordingly, a possible malfunction of the portion of the control system covering from the photodiode 12 to the current/voltage converter 20 can be detected to thereby prevent data on the optical disk 1 from being destroyed by an erroneous beam caused by the malfunction of the laser control circuit 15. Further, a signal representing the cause of the malfunction will be latched by the latch 38 in an operation similar to the aforementioned operation and will be used for an analysis of the malfunction that is executed later.

If the voltage signal Ve having a magnitude higher than the reproduced light upper limit voltage Vb is generated at the beginning t6 of the period B3 due to some malfunction of the laser control circuit 15, an "H" level signal will appear at the output terminal of the comparator 31 and be supplied to the other input of the NAND gate 40. Consequently, the NAND gate 40 outputs an "H" level signal. This signal is supplied to one input of the AND gate 39 which has its other input terminal supplied with the reproduced optical output control signal S11 with an "H" level. As a result, the AND gate 39 outputs the signal S31 which rises at time t6. The signal S31 is inverted as it passes through the NOR gate 37 and is supplied as the error signal S40 to the OR gate 46 and delay element 45. The contact of the relay circuit 17 will be disconnected as per the previously-described operation, thus cutting off the voltage E. Accordingly, emission of a laser beam will be stopped to thereby prevent data on the optical disk 1 from being destroyed by an erroneous beam caused by the malfunction of the laser control circuit 15. Further, a signal representing the cause of the malfunction will be latched by the latch 38 in an operation similar to the aforementioned operation and will be used for an analysis of the malfunction that is executed later. In summary, in the reproducing mode where a low-intensity laser beam is generated, a malfunction of the laser control circuit 15 can be detected if the voltage signal Ve from the photodiode 12 is not between the reproduced light lower limit voltage Va and reproduced light upper limit voltage Vb.

Detection of a malfunction in the recording mode will now be described. During the period C1 in FIG. 6, the voltage signal Ve from the photodiode 12 is between the reproduced light upper limit voltage Vb and recording light upper limit voltage Vc. This period indicates that data recording is being properly executed.

If the voltage signal Ve having a magnitude higher than the recording light upper limit voltage Vc is generated at the beginning t8 of the period C2 due to some malfunction of the laser control circuit 15, an "H" level signal will appear at the output terminal of the comparator 32 and be supplied to one input of the AND gate 41. The other input terminal of the AND gate 41 is supplied with the recording control signal S12 with an "H" level. Consequently, the AND gate 41 outputs the signal S32 which rises at time t8. The signal S32 is inverted as it passes through the NOR gate 37 and is supplied as the error signal S40 with an "L" level to the OR gate 46 and delay element 45. The contact of the relay circuit 17 will be disconnected as per the previously-described operation, thus cutting off the voltage E. Accordingly, emission of a laser beam will be stopped to thereby prevent data on the optical disk 1 from being destroyed by an erroneous beam caused by the malfunction of the laser control circuit 15. Further, a signal representing the cause of the malfunction will be latched by the latch 38 in an operation similar to the aforementioned operation and will be used for an analysis of the malfunction that is executed later.

As described above, in the reproducing or recording mode, abnormal light emission can be detected by checking whether or not the detected level of the emitted laser beam is within a predetermined range.

A description will now be given of detection of a malfunction in which the optical output becomes greater than a predetermined value while rotation of the spindle motor 2 is stopped. In general, if a laser beam is irradiated on an optical disk when the disk is not rotating or its speed has not reached a predetermined level, the energy intensity of the irradiated laser beam would become greater than the rated value with the result that recorded data may be destroyed. If the spindle motor 2 is not revolving or its speed has not reached a predetermined level, therefore, the rotate command signal S1 is rendered to have an "H" level and the emission of light from the semiconductor laser oscillator 6 is stopped. Therefore, existence of the voltage signal Ve initiated by the light emission under the above situation may be considered to be originated from a malfunction of the laser control circuit 15. In other words, if the voltage signal Ve having a magnitude higher than the reproduced light lower limit voltage Va is generated due to some malfunction of the laser control circuit 15, an "H" level signal will appear at the output terminal of the comparator 30 and be supplied to one input of the AND gate 42. The other input terminal of the AND gate 42 is supplied with the rotate command signal S1 with an "H" level. Consequently, the AND gate 42 outputs the signal S33 with an "H" level. The signal S33 is inverted as it passes through the NOR gate 37 and is supplied as the error signal S40 to the OR gate 46 and delay element 45. The contact of the relay circuit 17 will be disconnected as per the previously-described operation, thus cutting off the voltage E. Accordingly, light emission will be stopped to thereby prevent data on the optical disk 1 from being destroyed by an erroneous beam caused by the malfunction of the laser control circuit 15. Further, a signal representing the cause of the malfunction will be latched by the latch 38 in an operation similar to the aforementioned operation and will be used for analysis of the malfunction executed later.

According to this embodiment, as described above, various malfunctions of the laser control circuit 15 are detected by the malfunction detecting circuit 16, and when occurrence of an abnormality is detected, supply of power to semiconductor laser oscillator 6, photodiode 12 and laser control circuit 15 is cut off so that emission of a laser beam from the semiconductor laser can be surely stopped. This ensures prevention of destruction of data recorded on the optical disk 1. Since a signal representing the cause of the problems is held in the latch 38 for later analysis of the cause of a malfunction, it is easy to analyze the malfunction and find the cause thereof. Further, in extracting monitor signals for detection of a malfunction from a predetermined section of the laser control circuit 15, the resistors R3-R5 each having a high resistance are employed in order to prevent any adverse influences that might otherwise result from coupling the malfunction detecting circuit 16 to the laser control circuit 15, thus preventing reduction in reliability of the apparatus.

Figure 7:
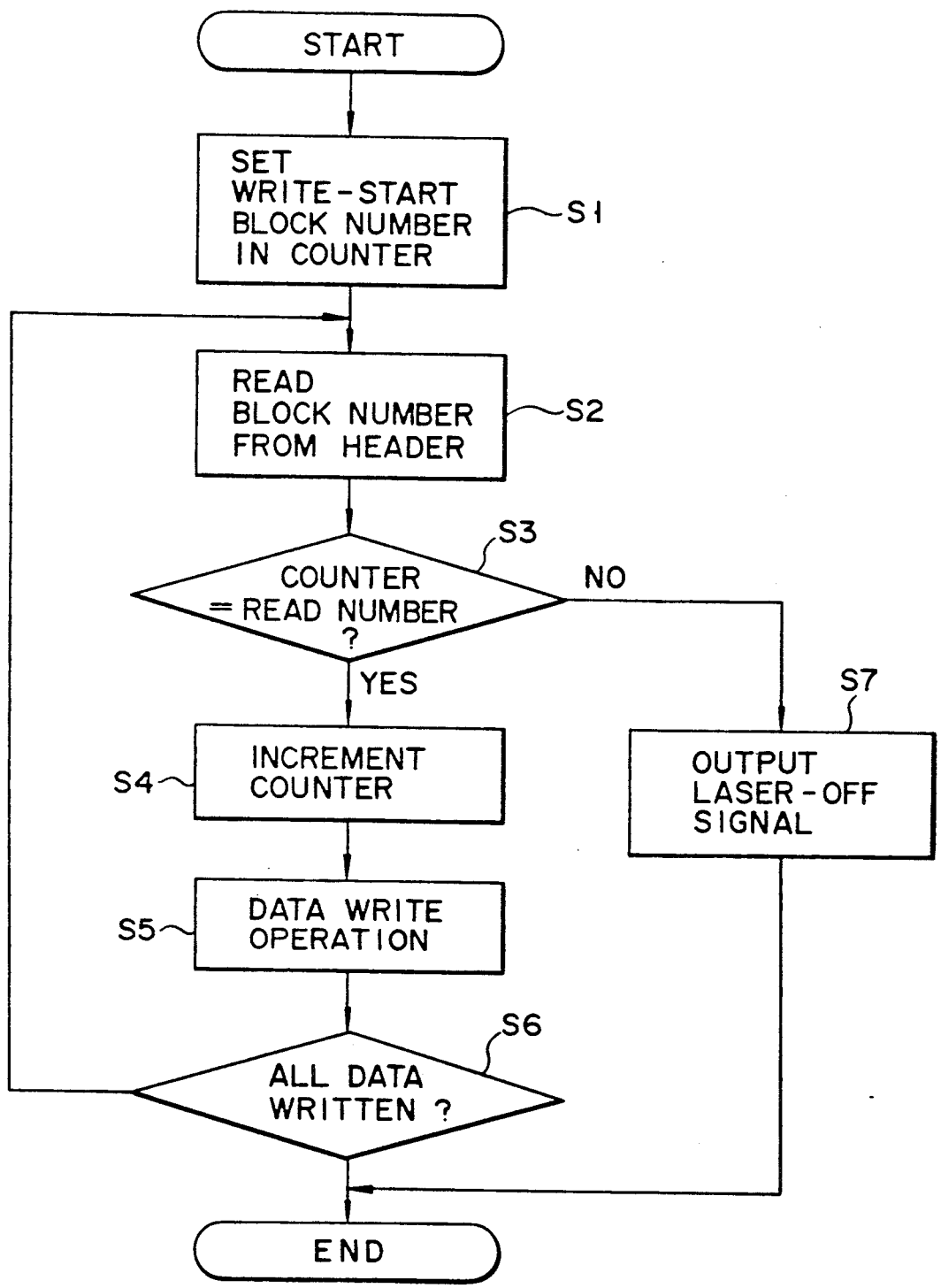
FIG. 7 is a flowchart illustrating an operation for prevent overwriting.

The operation of the main controller 4 to prevent overwriting even upon occurrence of a tracking error in the recording mode will now be described referring to the flowchart shown in FIG. 7. In this example, data is recorded consecutively along the spiral track from an inner position on the optical disk 1. If the amount of data recorded in a single recording operation is greater than the size of one block, the data is recorded on a plurality of blocks. In initiating a recording operation, the microcomputer included in the main controller 4 is provided with the block number of the first one of the unrecorded blocks on the optical disk 1. This block number may be given from an external host controller (not shown) or, alternatively, may be issued by the microcomputer itself. Based on this block number, the main controller 4 controls the moving mechanism (not shown) to move the optical head 5 to the target block and tracking and focusing controls are initiated. At this time, a laser beam having a reproducing level is emitted. In the meantime, in parallel to the above operation, the block number of the first block to have data recorded thereon is set as an initial value in a counter (not shown) in the main controller 4 (step S1). When the tracking and focusing are completed to be in focused and ON-track states to enable access to the optical disk 1, a bock number is read out from the header of the block presently accessed by the laser beam (step S2). This data can be attained by processing reflection light from the optical disk 1 resulting from irradiation of a reproducing laser beam thereon in the signal processing circuit 13 and header separate circuit 14. It is then determined whether or not the read block number coincides with the content of the counter (step S3). If a coincidence occurs, the flow advances to step S4 where the content of the counter is increased by one. The recording signal S7 according to the given data is sent to the laser control circuit 15 to emit a laser beam according to the data to thereby initiate data recording (step S5). Subsequently, it is determined whether or not recording of all data is completed (step S6). This determination is based on the amount of data recorded. The amount of data to be recorded on one block is predetermined. This step is performed upon reaching the end of the block onto which data is being recorded. If it is not completed, the flow returns to step S2 and the aforementioned operation will be repeated. If the read block number does not coincide with the content of the counter in step S3, it may be determined that the access order of blocks has become noninconsecutive due to, for example, a tracking error. The laser OFF signal S36 having an "H" level is output from controller 4, thus terminating the process (step S7). This signal S36 is inverted as it passes through the NOR gate 37, and is supplied as an "L" level error signal S40 to the OR gate 46 and delay element 45. Thereafter, the contact of the relay circuit 17 will be disconnected as per the previously-described operation, thus cutting off the voltage E. Accordingly, emission of a laser beam is stopped to thereby prevent data on the optical disk 1 from being destroyed by a tracking error.

As described above, consecutiveness of block numbers is determined at the time the block number are read out from the header areas prior to a recording operation, and when there is no consecutiveness found, it is determined that a tracking error has occurred. Consequently, the contact of the relay circuit 17 is disconnected to disable emission of the laser beam from the semiconductor laser oscillator 6. In this manner, the laser beam ca be prevented from being irradiated onto blocks other than the target block, thus preventing destruction of data already recorded on the optical disk 1.

As described above, this invention can provide an optical data recording/reproducing apparatus which can detect a malfunction of the laser control circuit and prevent data destruction by stopping emission of the laser beam from the light source, when the intensity of an optical output is not equal to a predetermined level in the recording or reproducing mode.

What is claimed is:

1. An optical data recording/reproducing apparatus comprising:
   means for providing a light irradiation command;
   light source means for irradiating a light beam onto a recording medium in response to the light irradiation command;
   detector means for detecting an amount of light irradiated from said light source means;
   feedback control means, connected to said light source means and detector means, for supplying a drive signal to said light source means to control an amount of light from said light source means in accordance with the amount of light detected by the detector means; and
   inhibition means for inhibiting the operation of said feedback control means when the amount of light detected during a period in which the light irradiation command is not provided is greater than or equal to a predetermined amount.

2. An optical data recording/reproducing apparatus comprising:
   means for providing a light irradiation command;
   light source means for irradiating a light beam onto a recording medium in response to the light irradiation command;
   detector means for detecting an amount of light irradiated from said light source means;
   feedback control means, connected to said light source and detector means, for supplying a drive signal to said light source means to control an amount of light from said light source means in accordance with the amount of light detected by the detector means; and
   inhibition means for inhibiting the operation of said feedback control means when the amount of light detected during a period in which the light irradiation command is not provided is greater than or equal to a predetermined amount;
   wherein during a recording mode and a reproducing mode, wherein the light irradiation command is provided, said recording means is rotated so that said light beam from said light source means traces tracks formed on said recording medium, and in a standby mode, said recording medium is not rotated and the light irradiation command is not provided, and wherein said inhibition means comprises first means for inhibiting the operation of said feedback control means when the amount of light detected is greater than or equal to a first determined amount in the standby mode; and second means for inhibiting the operation of said feedback control means when the amount of light detected is greater than or equal to a second predetermined amount during a period in which a rotating speed of said recording medium is lower than a predetermined speed.

3. The apparatus according to claim 2, further comprising means for recording operational statuses of said first and second means when the operation of said feedback control means is inhibited.

4. The apparatus according to claim 1, wherein said detector means comprises:
   photoelectric converter means for receiving reflection light from said recording medium and generating a current corresponding to the amount of light received;
   current/voltage converter means for converting an output current of said photoelectric converter means into a voltage;
   a resistor having one end coupled to an output terminal of said current/voltage converter means and having a resistance greater than an output resistance of said current/voltage converter means; and
   means for comparing a voltage at an other end of said resistor with a predetermined voltage.

5. The apparatus according to claim 1, wherein said inhibition means comprises means for shutting off power supply to said light source means and said feedback control means when the amount of light detected is greater than or equal to the predetermined amount.

6. The apparatus according to claim 2, wherein said feedback control means comprises means for supplying a drive signal having a value corresponding to a difference between the amount of light detected and the corresponding predetermined amount for each mode to said light source means to thereby make the amount of light detected constant; and wherein said inhibition means comprises means for inhibiting the operation of said feedback control means when the value of said drive signal is greater than or equal to a predetermined value during a period in which the light irradiation command is not provided.

7. The apparatus according to claim 6, wherein said inhibition means further comprises:

third means for inhibiting the operation of said feedback control means when the value of said drive signal is greater than or equal to a second predetermined value in the standby mode; and fourth means for inhibiting the operation of said feedback control means when the value of said drive signal is greater than or equal to a third predetermined value during a period in which a rotating speed of said recording medium is lower than said predetermined speed.

8. The apparatus according to claim 7, further comprising means for recording operational statuses of said first to fourth means when the operation of said feedback control means is inhibited.

9. The apparatus according to claim 6, wherein said feedback control means comprises a transistor, having a base supplied with said drive signal, for supplying a collector current to said light source means; and wherein said inhibition means comprises:

a resistor having one end coupled to an emitter of said transistor and having a resistance greater than an emitter resistance of said transistor;

comparator means for comparing a voltage at an other end of said resistor with a predetermined voltage; and means for inhibiting the operation of said feedback control means in accordance with a comparison result from said comparator means.

10. An optical data recording/reproducing apparatus comprising:

means for providing a light irradiation command;

light source means for irradiating a light beam onto a recording medium in response to the light irradiation command;

detector means for detecting an amount of light irradiated from said light source means;

feedback control means, connected to said light source means and detector means, for supplying a drive signal to said light source means to control an amount of light from said light source means in accordance with the amount of light detected by the detector means; and inhibition means for inhibiting the operation of said feedback control means when the value of said drive signal is greater than or equal to a predetermined value during a period in which the light irradiation command is not provided.

11. An optical data recording/reproducing apparatus, comprising:

means for providing a light irradiation command;

light source means for irradiating a light beam onto a recording medium in response to the light irradiation command;

detector means for detecting an amount of light irradiated from said light source means;

feedback control means, connected to said light source means and detector means, for supplying a drive signal to said light source means to control an amount of light from said light source means in accordance with the amount of light detected by the detector means; and inhibition means for inhibiting the operation of said feedback control means when the value of said drive signal is greater than or equal to a predetermined value during a period in which the light irradiation command is not provided, wherein during a recording mode and a reproducing mode, wherein the light irradiation command is provided, said recording medium is rotated so that said light beam from said light source means traces tracks formed on said recording medium, and in a standby mode, said recording medium is not rotated and the light irradiation command is not provided, and wherein said inhibition means further inhibits the operation of said feedback control means when the amount of light detected during a period in which the light irradiation command is not provided is greater than or equal to a predetermined amount.

12. The apparatus according to claim 11, wherein in the recording mode and the reproducing mode, said recording medium is rotated so that said light beam from said light source means traces tracks formed on said recording medium, and in a standby mode, said recording medium is not rotated; and wherein said inhibition means comprises:

first means for inhibiting the operation of said feedback control means when the amount of light detected is greater than or equal to a first predetermined amount in the standby mode; and second means for inhibiting the operation of said feedback control means when the amount of light detected is greater than or equal to a second predetermined amount during a period in which a rotating speed of said recording medium is lower than a predetermined speed.

13. The apparatus according to claim 12, further comprising means for recording operational statuses of said inhibition means when the operation of said feedback control means is inhibited.

14. The apparatus according to claim 10, wherein said detector means comprises:

photoelectric converter means for receiving reflected light from said recording medium and generating a current corresponding to the amount of light received;

current/voltage converter means for converting an output current of said photoelectric converter means into a voltage;

a resistor having one end coupled to an output terminal of said current/voltage converter means and having a resistance greater than an output resistance of said current/voltage converter means; and means for comparing a voltage at an other end of said resistor with a predetermined voltage.

15. The apparatus according to claim 10, wherein said inhibition means comprises means for shutting off power supply to said light source means and said feedback control means when the value of said drive signal is greater than or equal to the predetermined value.

16. The apparatus according to claim 10, wherein said feedback control means comprises a transistor, having a base supplied with said drive signal, for supplying a collector current to said light source means; and wherein said inhibition means comprises:

a resistor having one end coupled to an emitter of said transistor and having a resistance greater than an emitter resistance of said transistor;

comparator means for comparing a voltage at an other end of said resistor with a predetermined voltage; and means for inhibiting the operation of said feedback control means in accordance with a comparison result from said comparator means.

* * * * *